Oct. 3, 1967  R. B. KOCIAN ETAL  3,344,904
CAN HOLDER
Filed April 18, 1966  2 Sheets-Sheet 2
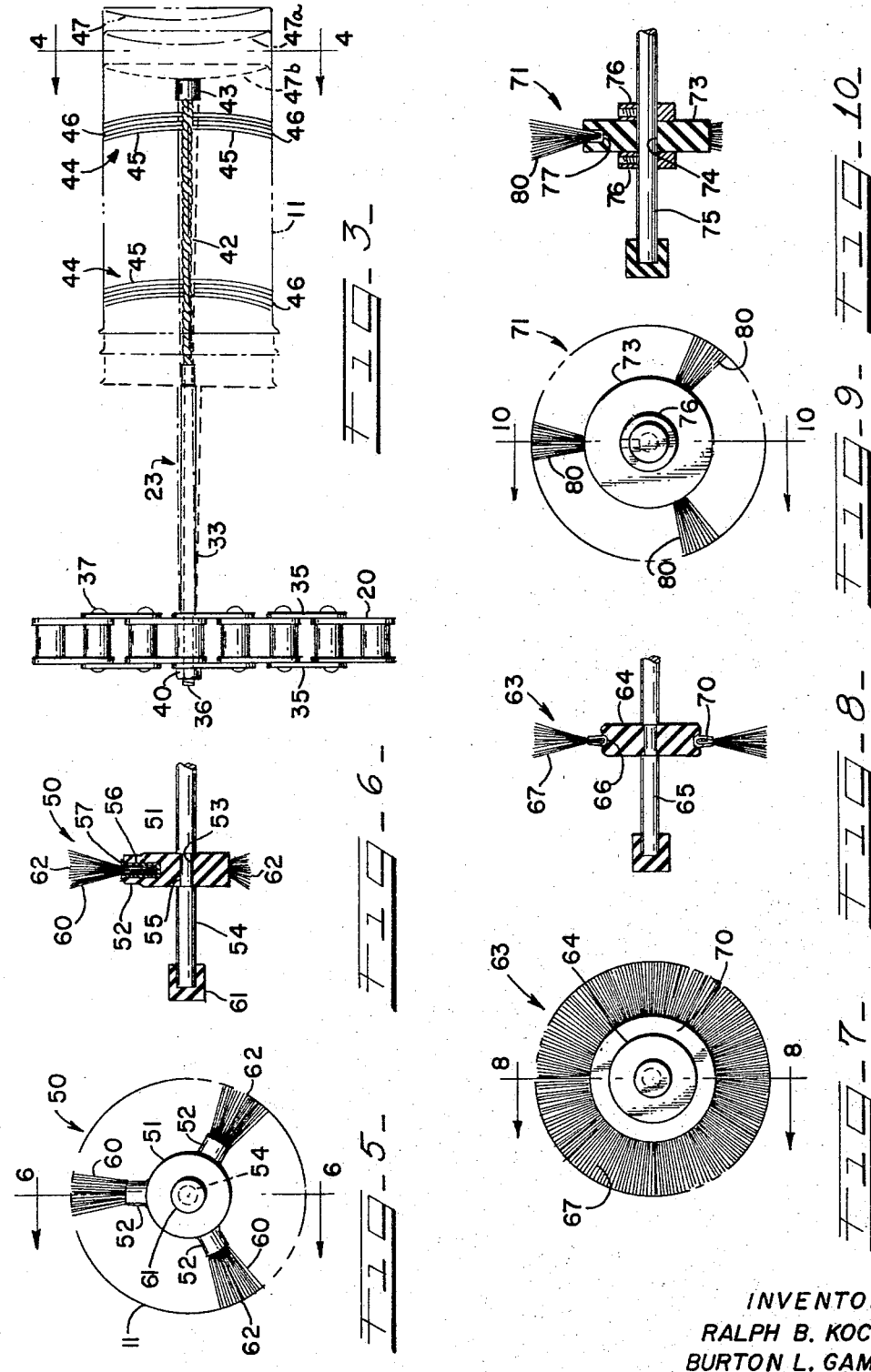
INVENTORS
RALPH B. KOCIAN
BURTON L. GAMBLE
BY Walter H. Boland
AGENT

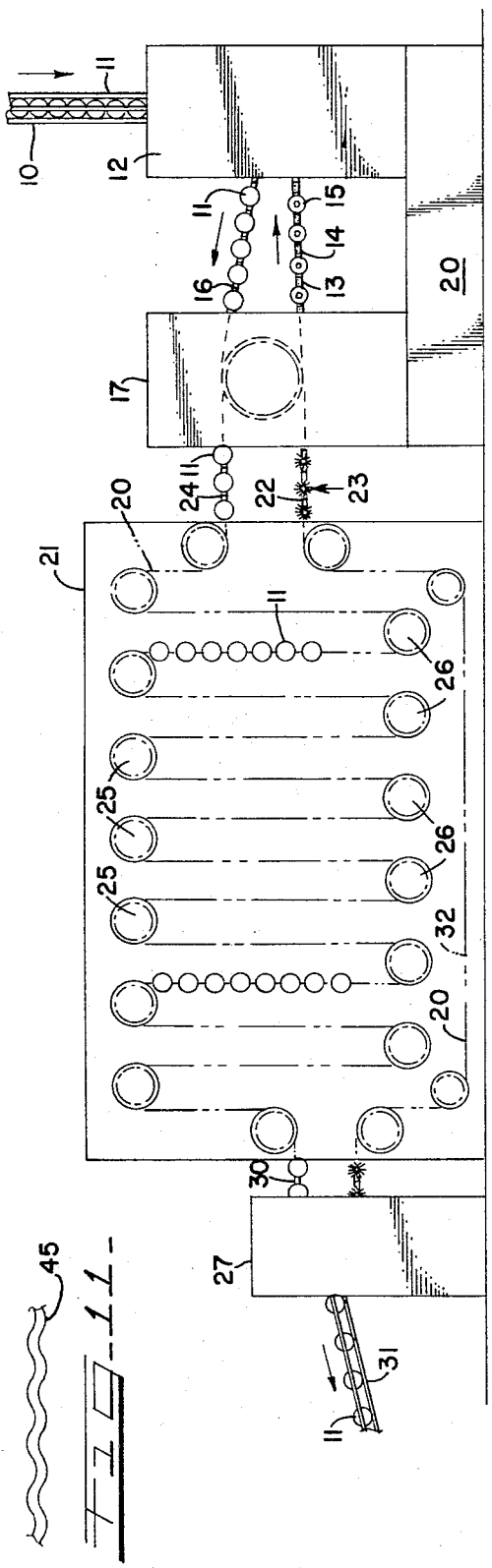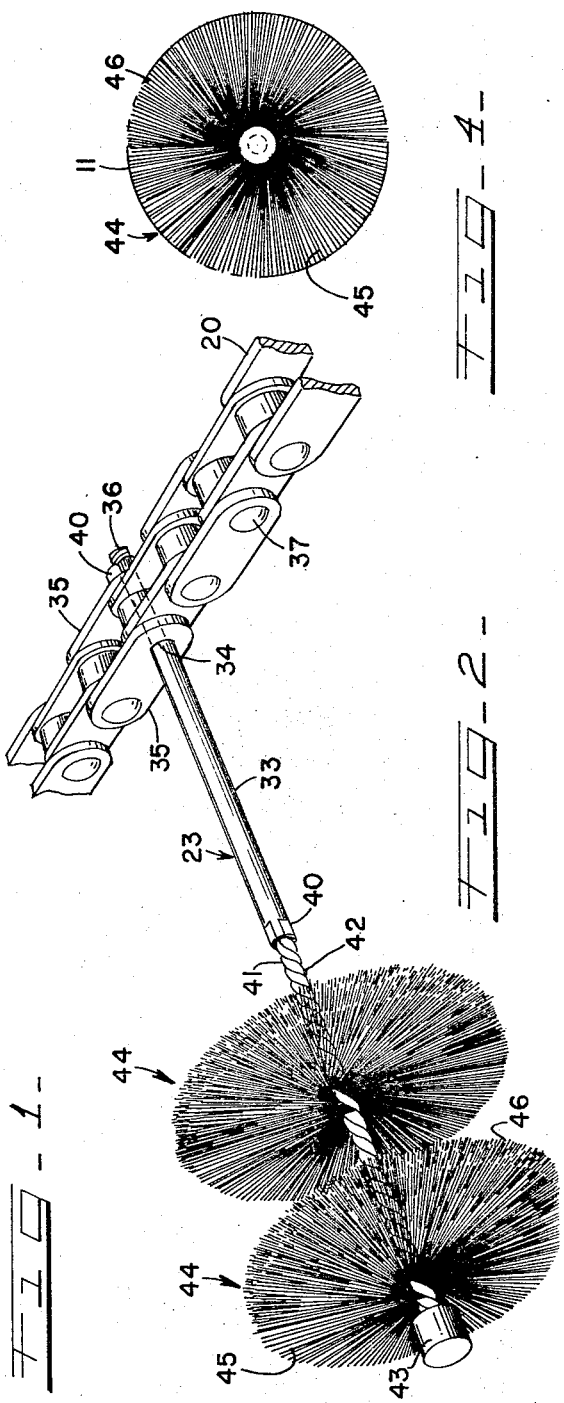

3,344,904
CAN HOLDER

Ralph B. Kocian, Chicago, and Burton L. Gamble, Hinsdale, Ill., assignors to Continental Can Company, Inc., New York, N.Y., a corporation of New York
Filed Apr. 18, 1966, Ser. No. 543,361
19 Claims. (Cl. 198—131)

ABSTRACT OF THE DISCLOSURE

An improved can holder for use on a conveyor chain for conveying the cans through a drying oven to dry coating material applied to the exterior of the cans. The holder includes a supporting rod that is attached at one end to the conveyor chain and extends from the chain in a horizontal direction. The supporting rod carries a great many fine resilient metal wires extending in a direction radially outwardly therefrom. The wires are of a length that results in a slight interference fit between outer ends of the wires and the interior wall of a can placed on the holder causing the wires to bow slightly. In this way the can is gently but firmly supported on the wire ends in such a manner that the normal vibration of the conveyor chain results in the can being urged further onto the holder.

---

This invention relates to the art of making lightweight tubular articles, such as, for example, collapsible tubes for such products as toothpaste, sealing compounds, adhesives, auto body repairing putty and the like, type of paste products, as well as can-bodies or empty cans for such products as beer and carbonated beverages.

During the manufacture of such tubular articles, it is often necessary that they be carried on chain conveyors through processing equipment; for example, drying ovens employed to dry decorative and protective coatings applied to exterior surfaces thereof. In order to provide the necessary drying time in the oven or other necessary processing time without making the oven or other processing equipment unnecessarily long, it is the practice to have the associated conveyor chain follow a tortuous path. The tortuous chain path is provided by training the chain in a series of vertical runs between a series of vertically spaced sprockets.

The usual practice, before the present invention, was to provide the conveyor chain with a great number of horizontally extending pins equally spaced along the length thereof over which the tubular articles being manufactured were placed. For the sake of lightness, the pins were of small diameter, usually in the order of about a quarter of an inch, so that the usual tubular article being much larger in diameter, was freely suspended on the pin. The free suspension of the tubular articles on the pins, although satisfactory at the usual slow chain speeds formerly employed, was found to be highly undesirable when modern high speed processing equipment was employed in that it was difficult to keep the articles from vibrating off the pins in passing through the processing equipment on the faster moving chain conveyor. With such a high speed conveyor, difficulty was encountered when the chain passed around the sprockets and particularly the upper sprockets. Due to centrifugal force, as a pin passed around an upper sprocket the tubular article thereon was slung outwardly and upwardly so as to be above the pin and it would then fall back down upon the pin with considerable force which occasionally resulted in the marring or scratching of the interior of the tubular article. This slinging of the tubular articles about the pins during the passage of the pins around the sprockets of the processing equipment and particularly around the upper sprockets, also, occasionally resulted in tubular articles being slung off of the pins at this time.

In accordance with the teachings of the present invention, the above problems associated with the commonly used pin type tubular article carriers have been substantially completely eliminated with the tubular articles being securely held in position during passage through the equipment on the chain conveyor at the new higher speeds in such a manner that they will not be vibrated off the holders; marred, scratched, or otherwise damaged.

The holding devices made in accordance with the present invention have wide application for holding tubular articles for transport by conveyors, such as chain conveyors, through processing equipment or between processing operations. They employ features that make them especially suited for carrying the new light-weight one-piece all aluminum empty cans through a drying oven. Such cans are presently being sold in considerable volume as beer containers. As is customary for beer containers, these new light-weight aluminum cans have printed-on decoration, advertising matter and information, usually in several colors extending around substantially the entire periphery of the side wall thereof which must be dried or cured by conveying the cans through a drying oven.

At the present time, by far the great majority of beer cans are fabricated from thin tin plated steel sheets. These cans are of the usual three-piece construction consisting of a can-body portion and two separate end portions double seamed thereto. The can-bodies are made from flat blanks which are cut from large sheets of tin plated steel. Before the large sheets are cut up into individual body blanks they are passed through a coating machine that applies a suitable protective coating such as lacquer or enamel to the side thereof that will eventually be in contact with the container contents. Upon being so protectively coated the sheets are delivered onto wickets against which they lean as they are being conveyed through a drying oven. The opposite side of the sheets is next presented to a suitable printing machine for application of the usual printed-on decoration, advertising matter and information. This matter is printed on in multiple units, each unit being for one of the multiplicity of can-body blanks into which the large sheet will subsequently be cut. After the printing operation, the sheets are again fed into a drying oven and conveyed therethrough on a chain conveyor while leaning against the usual oven wickets. Upon passing through the drying oven, the sheets are stacked and the stack of sheets is cut up on shearing machines into individual can-body blanks. Stacks of the blanks are then hand fed into the feed hopper of a body-maker. Individual blanks are removed from the bottom of the stack by means of suction cups and are fed with intermittent motion through the body-maker. In the body-maker, each blank is pushed sideways into a rolling unit where it is bent around a small diameter roll to break the tension or springiness in the blank. The side edges of each body blank are knurled as the blank passes through a knurling station; the knurls being to help the subsequent flow of solder into the sideseam. The blank is then delivered to a notching station at which the side edges are properly notched and clipped to prepare these edges for the subsequent formation of the inside and outside side-seam hooks. The blank is then passed through first and second folding stations wherein the inside and outside hooks for the side-seam are formed. Upon completion of the hook formations the blank passes through a fluxing station at which flux is applied to the hooks and laps along the side marginal blank edges. The prepared blank is now ready for rounding into the shape of a can-body, which operation is performed at a forming station. At the forming station, forming wings form the can-body blanks around a forming horn. The inside and outside side-seam hooks are engaged and bumped together into locked relationship by means of a reciprocating bumper block. The formed can-body is now removed from the forming horn by means of extractor bars and delivered to the conveyor chain of a side-seaming machine which carries the can-bodies through a soldering station at which solder is applied to the bumped side-seam to fill the interstitial spaces thereof. Excess solder is then wiped from the exterior surface of the seam and the seam is cooled by means of air blasts. As the can-bodies continue through the side-seamer, they are spray coated with lacquer on the inside along the side-seam. If desired, the outside of the side-seam may also be spray coated with a protective lacquer. In order to accomplish soldering of the side-seam, the preapplied protective and decorative coatings on the inside and outside of the can-body terminate a short distance laterally away from the center line of the side-seam providing an uncoated side seam stripe, the coating of which is the object of the just mentioned spraying operations. The can-bodies are now delivered from the side-seamer to a suitable conveyor for subsequent operations thereto.

In the manufacture of the new one-piece, seamless, light-weight all aluminum cans, it is necessary, due to the techniques of manufacturing this type of can, to perform all of the coating operations both interiorly and exteriorly after the can is completely formed. At the present time this type of container is being manufactured by two techniques, one of which is the impact extrusion method which is commonly employed for making collapsible tubes such as toothpaste tubes. In this technique a relatively thick round disk of annealed aluminum is placed into the bottom of a die cavity having a circularly cylindrical side wall corresponding to the exterior diameter of the can to be formed. A punch sized to the interior container diameter is then driven into the cavity so as to strike the aluminum slug with high impact causing the metal in the aluminum slug to extrude upwardly in the die cavity and around the punch, a distance sufficient to provide the necessary can height plus a waste portion that is trimmed off in a subsequent operation to provide an even container mouth rim. The container mouth rim is later flanged and the integral container bottom, which is flat, as initially formed is dished in so as to better withstand high internal pressures and so as to provide a rim around the periphery of the bottom of the container which provides an even resting surface for the container. Since liberal amounts of die lubricant must be used in forming containers by the impact extrusion process, it is necessary to thoroughly clean the containers before any coatings are applied thereto. This is accomplished by passing the containers through a large washing machine where they are treated with appropriate solvents and detergents and then thoroughly rinsed and dried. The containers or cans are now ready for the application of the usual exterior decorative coatings including printed information and advertising matter. Immediately after the printing operations, a transparent varnish overcoat may be employed to protect the printed-on decoration and also to provide a high gloss finish.

In the other commonly used technique employed in making the new one-piece, light-weight seamless all aluminum cans, shallow cup-like work pieces are first drawn and severed from flat aluminum sheet stock. These work pieces then have the shallow height wall portions thereof thinned out and lengthened to the desired can height by passing the work pieces through a series of wall ironing dies. Such cans also must be trimmed to proper length, have the mouth rim flanged, and the bottom dished in and be washed and exteriorly coated just like the cans formed by the impact extrusion process.

The cans formed by these techniques have an integral bottom and are therefore of one-piece construction until they are filled and the closure end is applied; the filled and closed container then being a two-piece construction. In either method of manufacture, after the cans are coated as desired on the exterior side wall surface thereof, they must be passed through a drying oven to dry the exterior coatings. In order to keep the size of the oven relatively small and to achieve rapid drying, it is desirable to operate the drying oven at a relatively high temperature. Temperatures within the range of 300°–400° F. are commonly employed. It is not unusual to operate the oven in the neighborhood of 400° F. plus or minus control tolerance. At these elevated temperatures, the aluminum interior container walls are relatively easily scratched or marred. Any scratching or marring of the interior container walls is highly objectionable when occurring at such elevated oven temperatures, since such scratched or marred areas act to repel the protective coating material subsequently sprayed onto the interior container wall surfaces. If such scratched or marred containers are frequently encountered, it becomes necessary to apply a heavier than normal interior coating in order to prevent metal exposure in the marred or scratched areas and it might perhaps be necessary to resort to multiple coatings being applied with oven drying between coatings in order to achieve complete and reliable metal coverage. For the sake of economy in the coating of the cans, it is, therefore, highly desirable that the interior of the cans not be scratched or marred while the cans are being conveyed through the drying oven on the conveyor chain. The commonly used horizontally extending metal pin type of can holding device permitted the cans too much freedom thereon and vibrated against the inner can surfaces to the extent that the objectionable marring and/or scratching were found to exist at an objectionably high frequency rate.

With the above commentary in mind as to the deficiencies of the commonly used pin type tubular article carriers, it is the general object of the present invention to provide a new and novel tubular article carrier or holder that will firmly hold a tubular article positioned thereon in place as it is being transported on a chain conveyor or the like, with the tubular article being supported entirely on inner surfaces thereof.

It is a somewhat more specific object of the invention to provide a carrier as just above described which is capable of being subjected to temperatures in the neigborhood of 400° F. for extended periods of time without appreciable adverse affect to its capabilities.

A further and still more specific object of the invention is to provide a new and novel carrier for metallic cans that is affixed to an oven chain conveyor and capable of holding a can firmly in place thereon; that contacts only the interior can surfaces; that will not mar, scratch, or otherwise damage the interior surfaces of the can; and, that is capable of withstanding oven temperatures in the neighborhood of 400° F. for prolonged periods of time without any appreciable loss of efficiency thereof.

A still further object of the invention is to provide a new and novel carrier for tubular objects, such as cans, for attachment to a conveyor, such as a chain conveyor; said carrier being light in weight so as not to overload the conveyor when a great many of the carriers are attached thereto; easily fabricated from commonly available relatively inexpensive materials and virtually maintenance free.

Still another object of the invention is to provide a novel fitment employed as a tubular article support; said fitment including a hub molded of resilient elastomeric material and including at least three groups of supporting wires extending radially from said hub.

Still another object of the invention is to provide a new and novel carrier for tubular objects that when subject to vibration causes a tubular object thereon to advance toward a fully on position in the event it is initially not on as far as it should be.

Further and more specific objects and advantages of the invention will become apparent from the following description taken in conjunction with the drawings in which:

FIG. 1 is a side elevation view of can processing apparatus including an oven and associated oven conveyor chain to which can carriers made in accordance with the invention are attached;

FIG. 2 is a perspective view of a can carrier constructed in accordance with the invention and illustrating the means by which it is attached to the oven conveyor chain;

FIG. 3 is a side view of the can carrier and associated conveyor chain of FIG. 2 and shows a can in phantom outline positioned thereon;

FIG. 4 is an enlarged end view taken along line 4—4 of FIG. 3;

FIG. 5 is an enlarged end view like FIG. 4 of a modified embodiment of the invention illustrating a can supporting fitment mounted on a support rod;

FIG. 6 is a fragmentary sectional view taken along line 6—6 of FIG. 5 and better illustrating the attachment of the fitment to the support rod;

FIG. 7 is a view similar to FIGS. 4 and 5 and shows a further type of can supporting fitment;

FIG. 8 is a fragmentary sectional view taken along line 8—8 of FIG. 7 and illustrates the mounting of the fitment on the support rod;

FIG. 9 is a view similar to FIGS. 4, 5 and 7 and shows a still further type of can supporting fitment;

FIG. 10 is a fragmentary sectional view taken along line 10—10 of FIG. 9 and illustrates a different way of mounting a fitment on the support rod, and, FIG. 11 is a fragmentary view showing a portion of one of the can supporting wires employed.

Referring to FIG. 1 of the drawings, it will be seen that a chute 10 is provided for delivering one-piece, integral bottom aluminum cans 11 to a printing machine 12. Associated with the printing machine 12 is an endless conveyor chain indicated at 13. As will be observed on the lower run 14 of the endless chain conveyor 13, cylindrically shaped can holding mandrels 15 are provided at equally spaced intervals along the length of the chain. In the printing machine 12 the cans 11 are placed on the mandrels 15; the cans positioned on the mandrels then being transported past appropriate printing and over-varnish drums. The printing usually consists of several color coats covering substantially entirely the exterior can side wall surface. After all of the color coats have been applied, they are preferably over-varnished with a clear transparent gloss coat. This completes the decorating operations and the decorated cans 11 are delivered along an upper run 16 of the chain 13 to a can transfer machine 17. As shown, the printing machine 12 and can transfer machine 17 are mounted on a common base 20.

In the can transfer machine 17, the freshly decorated cans are transferred from the mandrels 15 of the conveyor chain 13 to an oven conveyor chain 20 on which they are carried through a drying or curing oven that dries the just applied coatings; the oven being indicated at 21.

As will be seen by referring to a lower run of the oven conveyor chain 20 which is indicated at 22 entering the transfer machine 17, the oven conveyor chain 20 is provided with can carrying or holding devices indicated generally at 23 equally spaced along its length. As the lower run of the oven conveyor enters the can transfer machine 17, the can carrying or holding devices 23 mounted thereon are empty and ready to receive cans transferred thereto from the conveyor chain 13; the can transfer operation taking place entirely within the can transfer machine 17. The transferred cans 11 leave the can transfer machine 17 positioned on the can holding devices 23 disposed along an upper run 24 of the oven conveyor chain.

As the oven conveyor chain 20 carries the cans 11 through the drying oven 21 it alternately passes around upper sprockets 25 and lower sprockets 26; there being a multiplicity of such sprockets.

The cured cans are delivered from the oven to a can transfer machine 27 on an interconnecting upper run of the oven conveyor chain 20 indicated at 30. In the can transfer machine 27, the cured cans are removed from the can holding devices 23 and are delivered to a runway 31 ready for the application of the interior protective coating. The unloaded oven conveyor chain 20 returns from the can transfer machine 27 through the oven 21 along a lowermost run thereof indicated at 32 back to the can transfer machine 17 for reloading.

The can holder 23 illustrated in FIG. 2 includes a supporting rod 33 which is preferably round in transverse cross section and fabricated from a suitable metal such as steel or stainless steel. One end of the supporting rod 33 is reduced in diameter so as to provide a shoulder 34 which abuts against the outermost surface of an outer chain link 35 of the oven conveyor chain 20. The reduced diameter end indicated at 36 fits through an opening in the chain links normally occupied by one of the chain pins such as indicated at 37, with the diameter thereof being the same as the diameter of the replaced chain pin. At its terminal end the reduced diameter end portion of the supporting rod 33 is again lightly shouldered down to form an abutment for a nut 40 threaded onto suitable threads provided thereon; the nut 40 acting to retain the supporting rod 33 on the chain 20.

At its opposite or leftward end as viewed in FIG. 2, indicated by the numeral 40, the rod 33 is provided with an opening which receives an end 41 of a supporting rod 42 formed of twisted wire. At its opposite end the twisted wire rod 42 is provided with a suitable protective cap 43. The protective cap 43 may be attached to the rod end in any one of a number of suitable ways, such as, by means of an adhesive employed to effect the adherence of the protective cap 43 to the rod end. The end 41 of the twisted wire supporting rod 42 may be secured in the opening in the end of the rod 33 in a number of suitable ways, such as, by crimping the end of the rod 33 or by silver soldering, so that the rod 42 forms an extension of the supporting rod 33.

The just explained united rods 33 and 42 having a protective cap such as the cap 43 and being mounted as just described to a conveyor chain such as the chain 20 is generally typical of the rod or pin type tubular article holders of the prior art. In the manufacture of the new one-piece aluminum cans it was the practice to place the can over the rod or pin until the protective cap arrested further movement of the can onto the pin by striking against the bottom on the can. After being positioned on the pin the can would hang suspended thereon as the chain conveyor passed through the drying oven. It will be apparent that with this arrangement a can is permitted a great amount of freedom on the rod or pin and there is the possibility that during high speed operation, it might be slung off of the pin or vibrated off during passage through the drying oven. The vibration of the carrier pin against the can coupled with the slinging of the can on the pin, particularly when the conveyor chain passed around sprockets often resulted in the scratching or marring of the interior can surfaces making subsequent interior coating operations difficult and expensive to insure proper coverage.

In accordance with the present invention, the formerly used can supporting pins, if a supply was on hand, could be modified as necessary and used as the supporting rods 33. A pair of can supporting elements is mounted on the supporting rod 42 in axially spaced relationship; the individual supporting element being generally indicated by the numeral 44. Each supporting element 44 is made up of a great many fine wires arranged in a group radiating outwardly from the supporting rod 42.

As shown in FIG. 11 the individual wires of the supporting elements 44, designated as 45 are crimped so as to contain a series of corrugations when viewed from the side as in FIG. 11. Wires 45 made of stainless steel and being 0.005 inch in diameter have been found to excellently serve the purpose of the invention.

The wires 45 are attached by mechanically interlocking them in the twists of the twisted wire supporting rod 42.

As will be seen in FIG. 3, the ends of the wires 45 indicated at 46 contact the interior side wall surface of the can 11. The individual wire 45 is somewhat longer than the interior diameter of the can 11 so that the ends 46 thereof will be bowed backwardly, due to the interference fit, toward the chain 20 as illustrated in FIG. 3 when a can 11 is placed thereover. The wires 45 pass completely through the spirals of the twisted wire rod 42 so that both ends 46 of each wire 45 will contact the container side wall.

One of the most important features of the invention is the "walk-on" feature illustrated in FIG. 3. In the event a can 11 is not properly placed all the way on the carrier 23 so that the bottom thereof indicated at 47 is not in contact with the protective cap 43 as it should be when the can is all the way on the carrier 23; the normal vibration of the rod 33 and rod extension 42 as illustrated in phantom will result in the can moving leftwardly so that the can bottom will gradually move to the position as shown at 47a and finally 47b at which position it contacts the protective cap 43 and the can or container 11 is fully or completely on the holder or carrier 23. The "walk-on" feature is very pronounced and positive in action so that if the can 11, instead of being carried horizontally as shown in FIG. 3, were rotated clockwise 90° along with the chain 20 and holder 23 so that the can was held vertically on the carrier with the force of gravity now acting to remove the can the can will walk vertically upwardly from a partially on position to a fully on position as just described. Thus, with the present invention, the normally encountered vibration of the carrier 23 instead of acting to dislodge cans or the like containers mounted thereon actually has the opposite effect of causing partially on containers to move to a fully on position.

When a can or container 11 is not in position on a holder 23 the individual wires 45 making up the can supporting elements 44 will extend radially outwardly from the rod 42 in their normally unbowed condition. Since in the use of the holder 23 the wires 45 are subject to only a very slight bowing whenever cans are placed thereover, which will always be well within the elastic limits of the material from which the wires 45 are made, it will be apparent that the can supporting elements 44 may be used many millions of times without the wires thereof breaking due to being overstressed. The can holders 23 thus have a very long life expectancy.

Since the wires 45 are very fine and preferably, but not necessarily, corrugated as shown in FIG. 11 the ends 46 thereof will bear very lightly against the interior container side wall surface so as not to scratch, mar, or render the surface non-receptive to the subsequent interior protective coating to be applied. The corrugations preferred in the wires 45 render them even more flexible than they would normally be and hence eliminate any remote possibility of the ends 46 damaging the interior can side wall.

For carrying a typical beer can which may be approximately 2½ inches in diameter and 4½ inches long it is preferred to employ two such can supporting elements 44 as illustrated in FIGS. 2 and 3, but it is to be understood that for carrying longer tubular articles the twisted wire rod 42 can be made longer so as to accommodate a third or even a fourth can supporting element 44 axially spaced thereon. It is also feasible, although not every economical, when average sized cans are being processed to employ only one can supporting element 44 that would extend along the length of the twisted wire rod 42 a sufficient distance so as to alone support a can 11 placed thereover.

Although for corrosion resistance it is preferred that the wires 45 be made of stainless steel it will be apparent that other materials may be employed toward this same end, such as, for example, bronze. The twisted wire rod 42 may also be made of stainless steel, suitably clad common steel, or brass as well as from a number of other materials. For applications where the can holders 23 will not be subject to high temperatures protective caps 43 may be made from one of a number of suitable thermoplastic materials, such as, for example, nylon or polyethylene. However, when the container to be carried is to be subsequently interiorly protectively coated it must be ascertained whether contact of the material selected for the protective cap 43 against the container bottom will have any adverse affect upon the adherence of the protective coating material employed.

Where the can holder 23 is to be subjected to high temperatures such as encountered in the oven 21, it has been found that tips 43 made from tin will not to any objectionable extent mar, or scratch, the can bottoms or render them non-receptive to a subsequently applied protective coating. It has also been found that protective caps made from an asbestos mat filler impregnated with a high-temperature phenolic resin binder hold up very well at oven temperatures in the neighborhood of 400° F. This material which is relatively hard and exhibits low friction properties, is sold under the trade name "Synthane" by the Synthane Corporation, Oaks, Pennsylvania. Protective caps made from this material also will not mar or scratch the interior of the can bottom or render the can surface in contact therewith non-receptive to the subsequent interior protective coating.

An advantage of the can carrier of FIGS. 2–4 is that it is very light, and, when employed in great numbers on a chain, will not overload the chain if the chain was initially strong enough to support the formerly used can supporting pins, since the only additional weight added is that of the fine wires 45 which is so low as to be negligible. Another advantage is that it is also very inexpensive. In view of these advantages it is the preferred embodiment of the invention.

In FIGS. 5 and 6 is illustrated a fitment 50 for supporting cans which may be used as a substitute for the can supporting elements 44. The fitment 50 includes a hub portion 51 having three bosses 52 equally spaced about the periphery thereof.

The hub portion 51 is in the shape of a short circular cylinder and has an opening 53 through the center thereof. A plurality of the fitments 50 mount in axially spaced relation on a supporting rod 54 which is similar to the supporting rod 33 but is of a length substantially the same as the combined lengths of the coextensive rods 33 and 42. The rod 54 is provided with a groove 55 extending around the periphery thereof for each fitment 50 to be installed thereon. Hub portion 51 and the bosses 52 thereon are integrally molded from a relatively soft and elastic elastomeric material. It is thus possible to mount the hub portion 51 on the rod 54 by forcing the rod 54 through the opening 53 and by moving the hub portion 51 along the rod 54 until it reaches the groove 55 wherein the hub will snap in place in the groove due to the opening 53 being of smaller diameter than the general diameter of the rod 54. Bosses 52 are in the form of small diameter circular cylinders extending radially outwardly from the hub portion 51; each boss having a radially extending cavity opening through the end thereof as indicated at 56. The cavity 56 is preferably circular in transverse cross section and receives a bushing 57 which is force fitted therein. Bushing 57 in turn provided with a bushing 57 and group of wires 60 as receives a plurality of can supporting wires 60 that are like the wires 45 of FIG. 11. Each of the bosses 52 is shown in FIG. 5. The outer ends of the wires in the angularly spaced groups cooperate to describe a generally circular configuration, as illustrated in FIG. 5. A protective cap 61 similar to the protective cap 43 is provided on the end of the rod 54.

Although three groups of the wires 60 are shown equally circumferentially spaced on the hub 51 it is to be understood that if desired, more groups could be employed, but, for the sake of economy, it is preferred to employ only three groups.

As in the embodiment of the invention shown in FIGS. 2–4 it is necessary in order to achieve all of the objects of the invention that the outer tips 62 of the wires 60 extend outward radially sufficiently so that they will be bowed backwardly in the manner described with respect to FIG. 3 when a can 11 is placed thereover.

In FIGS. 7 and 8 is illustrated another fitment made in accordance with the invention, which is indicated generally by the numeral 63. Fitment 63 includes a hub portion 64 that is mounted on a rod 65 in the same manner that the hub portion 51 of the fitment 50 of FIGS. 5 and 6 is mounted on the rod 54. The hub portion 64 is likewise made from a relatively soft and elastic elastomeric material and has a circumferential groove 66 around the circular periphery thereof. A plurality of wires 67 similar to the wires 45 and 60 radiate outwardly in a direction from the center of the rod 65 with their inner ends being locked in an annular metal locking ring that is U-shaped in cross section as seen in FIG. 8; the locking ring being indicated by the numeral 70. Locking ring 70 seats in the circumferential groove 66 of the hub portion 64.

It is to be noted that the wires 67 are not disposed in groups around the rod 65 as are the wires 60 about the rod 54 of the showing of FIGS. 5 and 6 but instead are evenly spaced all the way around the rod 65 as shown in the embodiment of FIGS. 2–4.

The hub portions 51 and 64 of the embodiments of FIGS. 5–8 may be made of either natural or synthetic rubber for applications where high temperatures are not encountered. However, when they are to be used in ovens such as the oven 21 it was found that ordinary rubber either natural or synthetic would rapidly deteriorate and become unserviceable as a result of the heat. Silicone rubber which is a polysilioxane commonly sold under the trade name "Silastic" and "Silicone" was found to last indefinitely at temperatures in the neighborhood of 400° F. A flourinated hydrocarbon elastomer sold under the trade names "Viton," "Viton B," "Flourel" and "Fel-F" may also be used effectively as a substitute for silicone rubber due to its ability to withstand high temperatures.

A still further can supporting fitment is shown in FIGS. 9 and 10 and generally indicated by the numeral 71. This fitment includes a circular hub 73 which may be made of the same materials as the hub portions 51 and 64 or of a harder material such as nylon or "Synthane"; the "Synthane" being especially suited for high temperature oven work. The hub 73 is provided with an opening 74 therethrough into which fits a supporting rod 75. A set collar 76 on each side of the hub 73 holds the fitment 71 against axial movement along the rod 75. A plurality of cavities 77 opening through the periphery of the hub 73 extend in a radial direction down in the hub toward the center of the rod 75. The cavities 77 are filled with groups of wires 80 similar to the wires of the previously explained embodiments. It will be observed in FIG. 9 that three such groups of wires 80 are shown radiating outwardly from the hub 73 at equally spaced apart locations about the periphery of the hub 73, cooperating such that wire outer ends describe a generally circular configuration. Here also it is to be understood that more groups of wires 80 could be arranged about the periphery of the hub 73 but in the interest of economy and also for better air circulation within a can 11 placed over the fitment 71 it is preferred that only three such groups of wires 80 be employed on each fitment 71.

In order to position a can 11 on a holding device 23 as shown in FIG. 3, all that is necessary is to bring the can into position where its longitudinal axis is in axial alignment with the longitudinal axis of the rods 33 and 42. The can is then moved axially to the left as viewed in FIG. 3 until the protective cap 43 strikes the concave bottom panel of the can at 47b. This results in all of the wires 45 automatically bowing leftwardly in the desired manner as shown. The removal of the can from the holding device 23 is accomplished merely by moving it rightwardly which results in the flexing of the wires 45 so that they now bow in the opposite direction than that illustrated as the can slides off of the ends 46 of the wires 45. The can 11 is placed on and removed from a carrier in the same manner when the fitments of FIGS. 5–10 are substituted for the can supporting elements 44 of FIG. 3.

While preferred forms of the invention have been shown and explained in compliance with 35 U.S.C. 112, it is to be clearly understood that various changes in the details of construction and arrangement of parts may be made without departing from the spirit and scope of the invention as defined in the appended claims.

What is claimed is:

1. In a drying oven for drying coating material applied to the exterior of light-weight tubular articles such as cans, including an endless conveyor having a plurality of tubular article-carrying devices extending therefrom and spaced apart along the length thereof; the improvement comprising said tubular metal article-carrying device having a supporting rod over which a tubular metal article is placed; a great many fine resilient metal wires supported by and extending in a direction radially outwardly from the supporting rod; at least some of the wires being angularly spaced about the rod so that their free ends describe a generally circular configuration, with some of the wires being spaced axially along the rod with respect to other of the wires and the wires being sized as to length to provide a slight interference fit between the outer ends thereof and the interior tubular wall of the metal article, said wire length and tubular walls cooperating to define means for resiliently bowing said wires to be generally convex in the direction of an applied article and retaining said wires in their bowed condition, said wire ends and article wall cooperating to define frictional means whereby a greater force is required to remove the metal article than to apply the metal article over said carrying device, resulting in the outer ends of the bowed wires pressing lightly outwardly against the interior tubular wall to retain the tubular article in place on the carrying device.

2. A tubular article carrying device as specified in claim 1 in which the fine resilient metal wires are corrugated.

3. A tubular article carrying device as specified in claim 2 in which the fine resilient corrugated metal wires are made of stainless steel.

4. A tubular article carrying device as specified in claim 3 in which the fine resilient corrugated stainless steel wires are in the neighborhood of 0.005 of an inch in diameter.

5. A tubular article carrying device as specified in claim 1 in which the fine resilient metal wires are arranged in groups and there being at least two such groups of wires spaced axially along the supporting rod.

6. A tubular article carrying device as specified in claim 5 in which a fitment is provided for supporting each group of wires, said fitment including a hub having an opening therethrough into which the supporting rod fits.

7. A tubular article carrying device as specified in claim 6 in which the said hub is made of a relatively soft and elastic elastomeric material.

8. A tubular article carrying device as specified in claim 7 in which the relatively soft and elastic elastomeric material from which the said hub is made is capable of withstanding elevated temperatures in the order of 400° F. for extended lengths of time without any appreciable deterioration.

9. A tubular article carrying device as specified in claim 8 in which the relatively soft and elastic elastomeric material is silicone rubber.

10. A tubular article carrying device as specified in claim 8 in which the relatively soft and elastic elastomeric material is a flourinated hydrocarbon elastomer.

11. A tubular article carrying device as specified in claim 1 in which the supporting rod includes an extension portion made of twisted wire with the said fine resilient metal wires being attached to the twisted wire extension portion.

12. A tubular article carrying device as specified in claim 5 in which the supporting rod includes an extension portion made of twisted wire with the said groups of fine resilient metal wires being attached to the twisted wire extension portion.

13. A tubular article carrying device as specified in claim 12 in which the fine resilient wires are corrugated.

14. A tubular article carrying device as specified in claim 13 in which the fine resilient corrugated wires are made of stainless steel.

15. A tubular article carrying device as specified in claim 14 in which the fine resilient corrugated stainless steel wires are in the neighborhood of 0.005 of an inch in diameter.

16. A tubular article carrying device as specified in claim 6 in which the said hub is made of an asbestos mat filler impregnated with a high-temperature phenolic resin binder.

17. A tubular article-carrying device comprising: a supporting rod over which a tubular metal article is placed; a great many fine resilient metal wires supported by and extending in a direction radially outwardly from the supporting rod; at least some of the wires being angularly spaced about the rod so that their free ends describe a generally circular configuration, with some of the wires being spaced axially along the rod with respect to other of the wires, and the wires being sized as to length to provide a slight interference fit between outer ends thereof and the interior tubular wall of the metal article resulting in the wires being resiliently bowed in the direction of motion of a tubular article being placed thereover by relative axial movement between the rod and the tubular article, said wire length and tubular walls cooperating to define frictional means, when said device is inserted into an article a distance sufficient to carry the article concentrically thereabout, and said device is vibrated, for effecting further movement of said article onto said device, the outer ends of said bowed wires being pressed lightly outwardly against the interior tubular wall to retain the tubular article in place on the carrying device.

18. The device of claim 17 wherein said fine wires are each of corrugated stainless steel, approximately 0.005 inch in diameter; said rod comprising twisted wires; said fine wires being mechanically held in place by being interlocked in the twists of said twisted wire supporting rod, a protective cap mounted on a first end of said twisted wire; said cap being made of an asbestos mat filler impregnated with a high temperature phenolic resin binder, including an end rod portion connected to a second end of said twisted wire, said end rod portion providing conveyor chain attachment means.

19. The device of claim 17 wherein said fine wires are disposed in axially spaced groups and a protective cap is provided at one end of said supporting rod for engagement against an end of a tubular metal article placed thereover.

References Cited
UNITED STATES PATENTS

| | | | |
|---|---|---|---|
| 1,214,278 | 1/1917 | Cole | 15—61 |
| 2,267,435 | 12/1941 | Thomas | 15—88 |
| 2,338,032 | 12/1943 | Friden | 198—131 |

RICHARD E. AEGERTER, *Primary Examiner.*

EVON C. BLUNK, *Examiner.*